(12) United States Patent
Dukes et al.

(10) Patent No.: US 7,871,079 B2
(45) Date of Patent: Jan. 18, 2011

(54) SEALING ASSEMBLY

(75) Inventors: Joseph Allen Dukes, Sugar Hill, GA (US); Kevin L Nelson, Cumming, GA (US); Rhonda Johnson, Chicago Heights, IL (US)

(73) Assignee: Panduit Corp., Tinley Park, IL (US)

( * ) Notice: Subject to any disclaimer, the term of this patent is extended or adjusted under 35 U.S.C. 154(b) by 509 days.

(21) Appl. No.: 11/931,959

(22) Filed: Oct. 31, 2007

(65) Prior Publication Data
US 2008/0290611 A1 Nov. 27, 2008

Related U.S. Application Data

(62) Division of application No. 11/751,716, filed on May 22, 2007, now Pat. No. 7,723,622.

(51) Int. Cl.
*F16L 17/06* (2006.01)
*F16J 3/00* (2006.01)
*H01B 7/29* (2006.01)

(52) U.S. Cl. .................. 277/616; 277/634; 277/637; 174/36

(58) Field of Classification Search ............ 277/609, 277/616, 628, 630, 634–635, 637; 174/36, 174/152 G, 153 G
See application file for complete search history.

(56) References Cited

U.S. PATENT DOCUMENTS

| 2,585,054 A | 2/1952 | Stachura |
| 2,718,225 A | 9/1955 | Wallin |
| 2,813,692 A | 11/1957 | Bremer et al. |
| 3,503,101 A | 3/1970 | Kolozsvary |
| 3,696,472 A | 10/1972 | Perina et al. |
| 4,086,736 A | 5/1978 | Landrigan |
| 4,465,288 A | 8/1984 | Kofoed, Sr. |
| 4,520,976 A | 6/1985 | Cournoyer et al. |
| 4,708,664 A | 11/1987 | Yard |
| 4,731,501 A | 3/1988 | Clark et al. |
| 5,392,571 A | 2/1995 | Greenfield |

(Continued)

FOREIGN PATENT DOCUMENTS

DE 2162251 6/1973

(Continued)

*Primary Examiner*—Vishal Patel
(74) *Attorney, Agent, or Firm*—Robert A. McCann; Christopher S. Clancy

(57) ABSTRACT

A sealing assembly having a flexible sleeve and a means for sealing a top portion of the sleeve around a plurality of cables, such as by a hook and loop type fastener attached at the top portion of the sleeve. The sleeve is configured to receive at least one cable therethrough and a bottom portion of the sleeve is configured to be secured to a surface. The sleeve can also be electrically conductive such that the sleeve dissipates static electricity from the cable to the surface. The sealing assembly can also have a grommet positioned adjacent the bottom portion of the sleeve. The grommet has a first wall having a plurality of apertures for connecting the grommet to a surface and a second wall that extends substantially perpendicular to the first wall and is configured to extend through an aperture in the surface. The second wall is flexible to protect the cable from sharp edges associated with the aperture in the surface.

20 Claims, 12 Drawing Sheets

U.S. PATENT DOCUMENTS

| | | |
|---|---|---|
| 5,440,841 A | 8/1995 | Greenfield |
| 5,628,157 A | 5/1997 | Chen |
| 5,630,300 A | 5/1997 | Chen |
| 5,664,810 A | 9/1997 | Zielinski |
| 5,908,180 A | 6/1999 | Daoud |
| 6,102,229 A | 8/2000 | Moncourtois |
| 6,255,597 B1 | 7/2001 | Bowling et al. |
| 6,265,670 B1 | 7/2001 | Duesterhoeft et al. |
| 6,369,326 B1 | 4/2002 | Rippel et al. |
| 6,369,329 B1 | 4/2002 | Moore |
| 6,384,326 B1 | 5/2002 | McFadden et al. |
| 6,523,584 B1 | 2/2003 | Rehrig |
| 6,632,999 B2 | 10/2003 | Sempliner et al. |
| 6,927,338 B2 | 8/2005 | Shimola et al. |
| 6,995,316 B1 | 2/2006 | Goto |
| 6,995,317 B1 | 2/2006 | Dzurilla |
| 7,064,268 B2 | 6/2006 | Dinh |
| 7,119,279 B2 | 10/2006 | Niehaus et al. |
| 7,122,749 B2 | 10/2006 | Pini |
| 7,141,744 B2 | 11/2006 | Cloutier |
| 2003/0037942 A1 | 2/2003 | Haselby et al. |

FOREIGN PATENT DOCUMENTS

| | | |
|---|---|---|
| DE | 2627447 A1 | 12/1977 |
| DE | 102006001644 A1 | 7/2006 |
| DE | 202007016555 U1 | 2/2008 |
| EP | 0766361 A1 | 4/1997 |
| GB | 2010988 A | 7/1979 |
| GB | 2028390 A | 3/1980 |
| GB | 2070927 A | 9/1981 |

SEALING ASSEMBLY

CROSS-REFERENCE TO RELATED APPLICATION

This application is a divisional of U.S. patent application Ser. No. 11/751,716, filed May 22, 2007.

FIELD OF INVENTION

This invention relates to sealing assemblies and, more particularly, to sealing assemblies for use with cables/cable bundles that pass through holes in raised floor panels of data centers.

BACKGROUND

In many instances data centers will use raised floors that consist of a plurality of floor panels that are suspended above the subfloor of the data center. The air handling space that is created between the subfloor and the raised floor can then be used for a variety of purposes. For example, the air handling space can be used to transfer cool air from a cooling unit to the equipment in the data center and can also be used to run cables to and between the equipment. When cables are run in the air handling space below the raised floor, apertures need to be cut into the floor panels to allow the cables to pass through the raised floor to the equipment. These apertures are positioned and cut based on the equipment layout in the data center. However, cutting these apertures in the floor panels allows the cool air that is being transferred to the equipment to escape through the apertures and around the cables.

Sealing these apertures in the raised floor is important because of the amount of cooling that is required for the data center equipment. In a typical data center layout, large cooling units route cold air into the air handling space below the floor and then into the equipment above through specifically positioned air-handling openings. Cable openings in the raised floor are not intended for cooling of the equipment and can significantly reduce the efficiency of the cooling units by allowing cool air to escape from the air handling space. The reduction in cooling efficiency is a result of the large cold air loss through cable openings. Using some type of seal to minimize air loss through the openings reduces the size requirement of the cooling units and significantly reduces the power usage, lowering operating costs.

However, standard sealing devices used in typical data center installations have various drawbacks. One example of a standard sealing device uses bristles or foam attached to a rigid frame in an attempt to cover the apertures in the raised floor panels. While this type of device may be satisfactory for a single cable that is centered in the device, it does not provide sufficient sealing if multiple cables or cable bundles are used or if the cable(s) are not centered in the device. In these instances, the bristles or foam of the device will move around the multiple cables or be moved out of the way by off center cables and create a potentially large opening for air to escape. In addition, the bristles have the potential to break loose from the frame and can potentially create a hazard to the equipment in the data center.

Therefore, there is a need for a sealing assembly that minimizes air loss through apertures in raised floor panels when multiple cables/cable bundles pass through the aperture and when a cable or cables are not centered within the aperture. It would also be beneficial to have a sealing assembly that protects cable(s) passing through the aperture from rough cut edges of apertures and that provides electrostatic dissipation from cable(s).

SUMMARY OF THE INVENTION

In one example, a sealing assembly has a flexible sleeve and a hook and loop type fastener attached to a top portion of the sleeve. The sleeve is configured to receive at least one cable therethrough and a bottom portion of the sleeve is configured to be secured to a surface.

In another example, a sealing assembly has a flexible sleeve and a means for sealing a top portion of the sleeve around a plurality of cables. The sleeve is configured to receive at least one cable therethrough and a bottom portion of the sleeve is configured to be secured to a surface.

In another example, a sealing assembly has a flexible sleeve that is configured to receive at least one cable therethrough. A top portion of the sleeve is configured to seal around the cable and a bottom portion of the sleeve is configured to be secured to a surface. The sleeve is electrically conductive such that the sleeve dissipates static electricity from the cable to the surface.

In another example, a sealing assembly has a flexible sleeve and a grommet positioned adjacent a bottom portion of the sleeve. The sleeve is configured to receive at least one cable therethrough. A top portion of the sleeve is configured to seal around the at least one cable and the bottom portion of the sleeve is configured to be secured to the grommet. The grommet has a first wall having a plurality of apertures for connecting the grommet to a surface and a second wall that extends substantially perpendicular to the first wall and is configured to extend through an aperture in the surface. The second wall is flexible to protect the cable from sharp edges associated with the aperture in the surface.

BRIEF DESCRIPTION OF THE DRAWINGS

Certain examples of the present invention are illustrated by the accompanying figures. It should be understood that the figures are not necessarily to scale and that details that are not necessary for an understanding of the invention or that render other details difficult to perceive may be omitted. It should be understood of course, that the invention is not necessarily limited to the particular examples illustrated herein.

DETAILED DESCRIPTION

Figure 1:
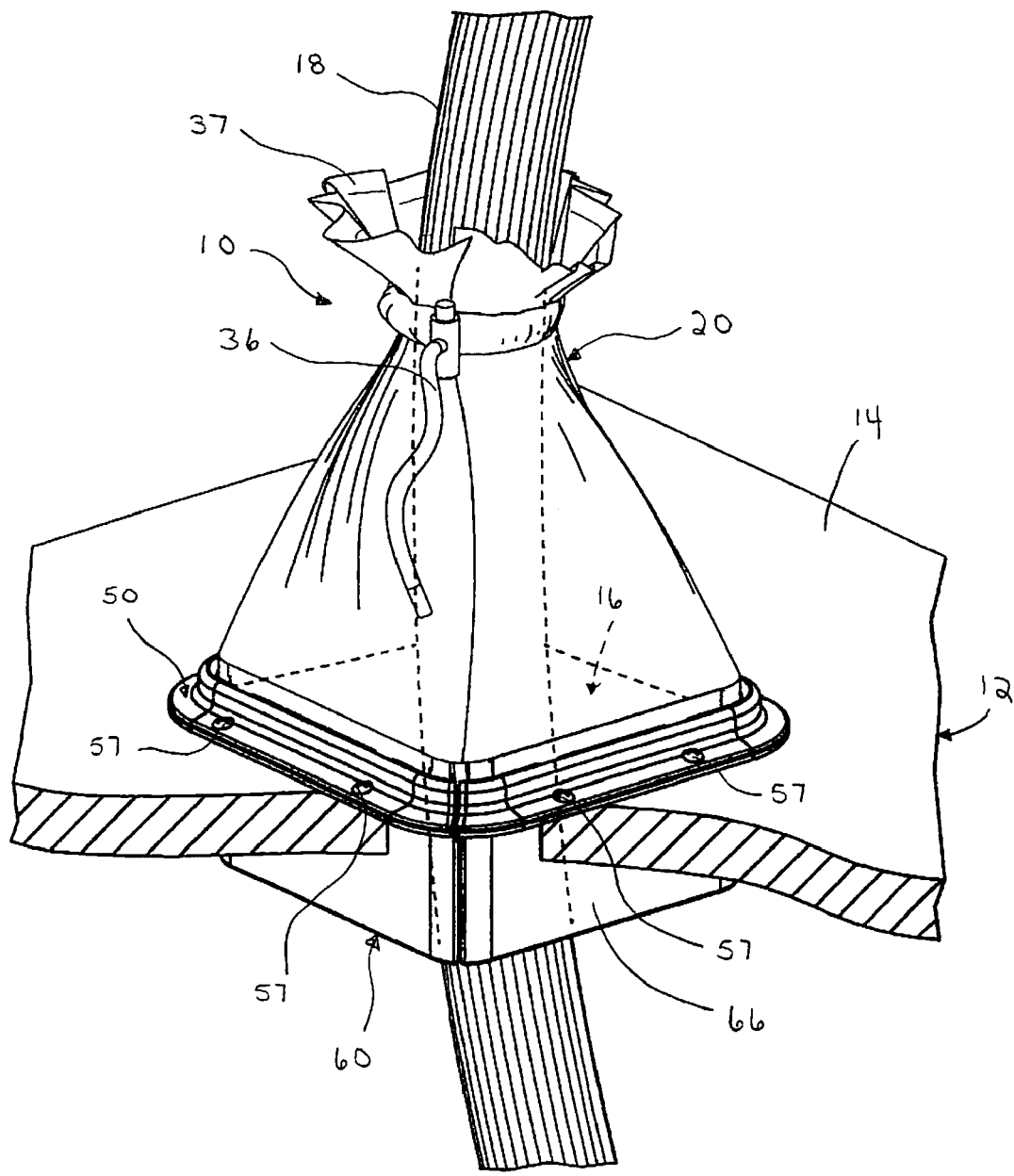
FIG. 1 is a perspective view of one example of a sealing assembly as installed on a partially cut away raised floor panel.
Figure 2:
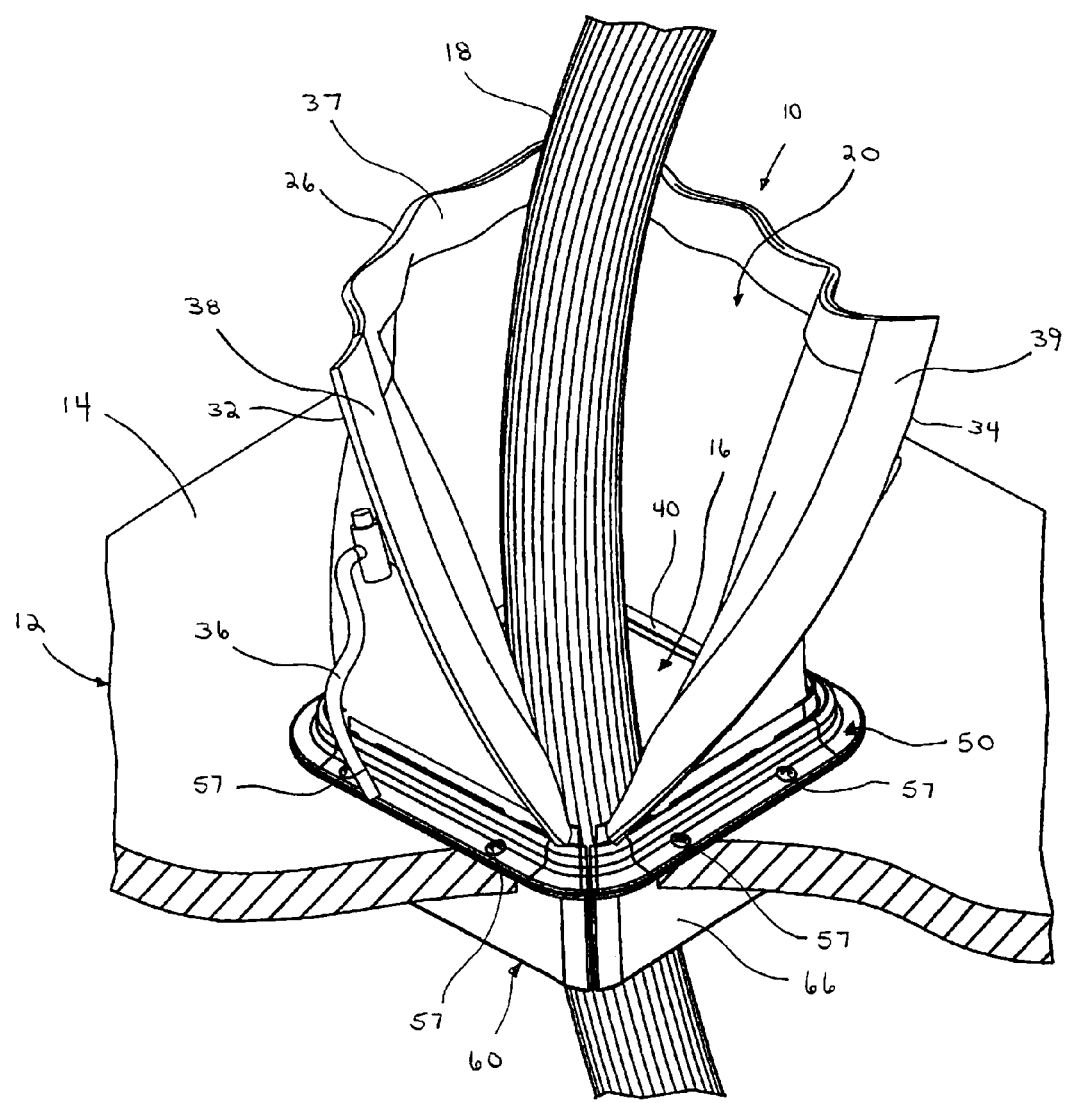
FIG. 2 is a perspective view of the sealing assembly of FIG. 1 with the sleeve in an open position.

Referring to FIGS. 1-10, one example of a sealing assembly 10 is shown as installed around a cable 18 passing through a floor panel 12, such as the floor panel of a raised floor in a data center. However, it will be understood that the various examples disclosed herein could be installed and used with any desired surface having an aperture therethrough, such as a standard floor, a wall, a ceiling, a drop ceiling, etc. As can be seen in FIG. 1, floor panel 12 has top surface 14, which is typically an electrically conductive material such as metal, and aperture 16, which allows the passage of cable 18 through top surface 14 of floor panel 12. Cable 18 could be a single cable, multiple cables, a cable bundle, or multiple cable bundles, depending on the particular installation. In this example, sealing assembly 10 generally has a sleeve 20, cover 50, frame 40, and grommet 60.

Referring generally to FIGS. 1, 2, 4, and 7, in this example, sleeve 20 is constructed of a sheet of flexible material that can be wrapped around cable 18 during installation. This simplifies the installation of sleeve 20 and allows for installation of sleeve 20 around existing cables that are already installed. Alternatively, sleeve 20 could be of a generally tubular construction that requires cable 18 to be passed through sleeve 20 for installation. In the example shown, strips of hook and loop type fastener 38, 39, such as Velcro®, are attached to first and second side edges 32, 34 of sleeve 20. Strips 38, 39 engage each other to connect first and second side edges 32, 34 and position sleeve 20 around cable 18. In alternate embodiments, any well known method could be used to connect first and second side edges 32, 34 of sleeve 20, such as snaps, buttons, rivets, double sided tape, etc.

In addition to being flexible, in this example sleeve 20 is constructed of a material that is electrically conductive, such as Dura-stat 3983, so that sleeve 20 assists in the dissipation of static electricity from cable 18, as discussed below. For example, sleeve 20 could be constructed of a static-dissipative, vinyl-coated fabric having conductive fibers wound therein.

In order to meet specific codes, sleeve 20 could also be constructed of a material that is flame retardant.

Drawstring 36 is positioned in the top portion of sleeve 20 and extends through a passageway or holes formed in sleeve 20. Drawstring 36 is used to cinch the top portion of sleeve 20 around cable 18 and any similar cinching mechanism could also be used. In installations where a single cable is present, drawstring 36 can be used to seal the top portion of sleeve 20 around cable 18. However, if multiple cables, a cable bundle, or multiple cable bundles pass through aperture 16, use of only drawstring 36 will leave air gaps between the cables/cable bundles and will not provide a complete seal.

In order to provide a more complete seal around multiple cables, a cable bundle, or multiple cable bundles, a strip of hook and loop type fastener 37, such as Velcro®, is attached to sleeve 20 above drawstring 36 and adjacent top edge 26 of sleeve 20. Strip 37 extends across substantially the entire top edge 26 such that varying portions of strip 37 can be closely wrapped around individual cables and/or individual cable bundles and engaged to seal the top portion of sleeve 20 around the individual cables and/or cable bundles.

Figure 7:
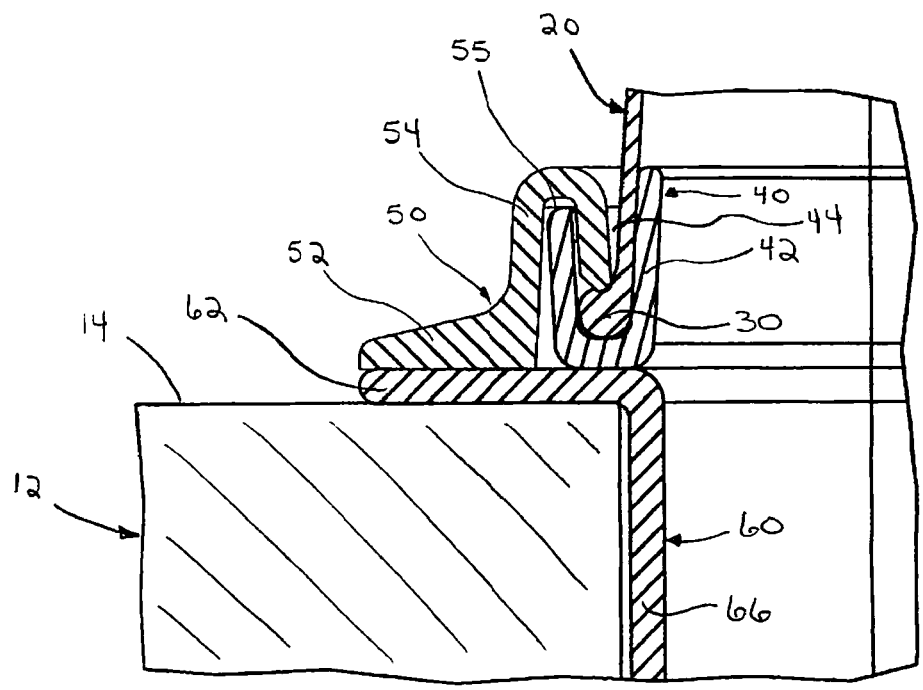
FIG. 7 is an enlarged partial view of the sealing assembly shown in the circle of FIG. 6.
Figure 8:
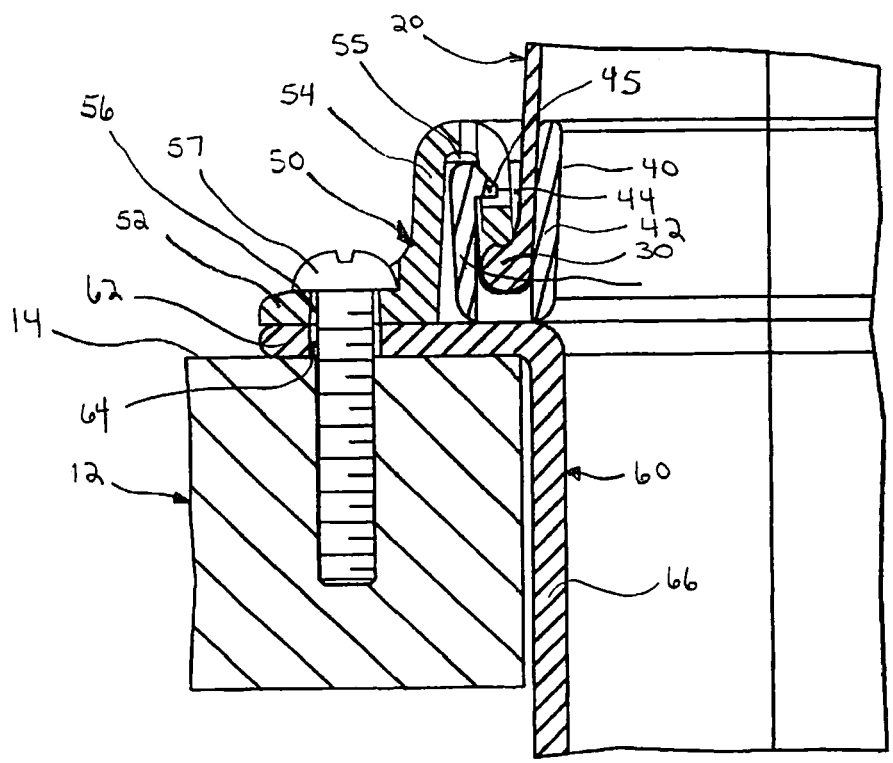
FIG. 8 is a cross-sectional view taken along line 8-8 in FIG. 5.

As can best be seen in FIGS. 4, 7, and 8, at the bottom portion of sleeve 20, bottom edge 28 has protuberance 30, which allows the bottom portion of sleeve 20 to be secured to top surface 14 through frame 40 and cover 50, as described below.

Referring generally to FIGS. 3, 4, and 6-8, in this example frame 40 and cover 50 are used to secure sleeve 20 to top surface 14.

In the example shown, frame 40 is generally square and is formed by wall 42. Wall 42 is generally U shaped, forming channel 44, which is configured to receive protuberance 30 of sleeve 20 and to receive the inside wall of second wall 54 of cover 50, as seen in FIGS. 7 and 8. As described in more detail below, protuberance 30 is first positioned within channel 44 and then the inside wall of second wall 54 of cover 50 is inserted into channel 44, trapping protuberance 30 between frame 40 and cover 50. In addition, at specified intervals around frame 40, the outer wall of U shaped wall 42 has protrusions 45 (see FIG. 8) that extend into channel 44 and engage apertures in second wall 54 of cover 50 to secure cover 50 to frame 40.

Figure 3:
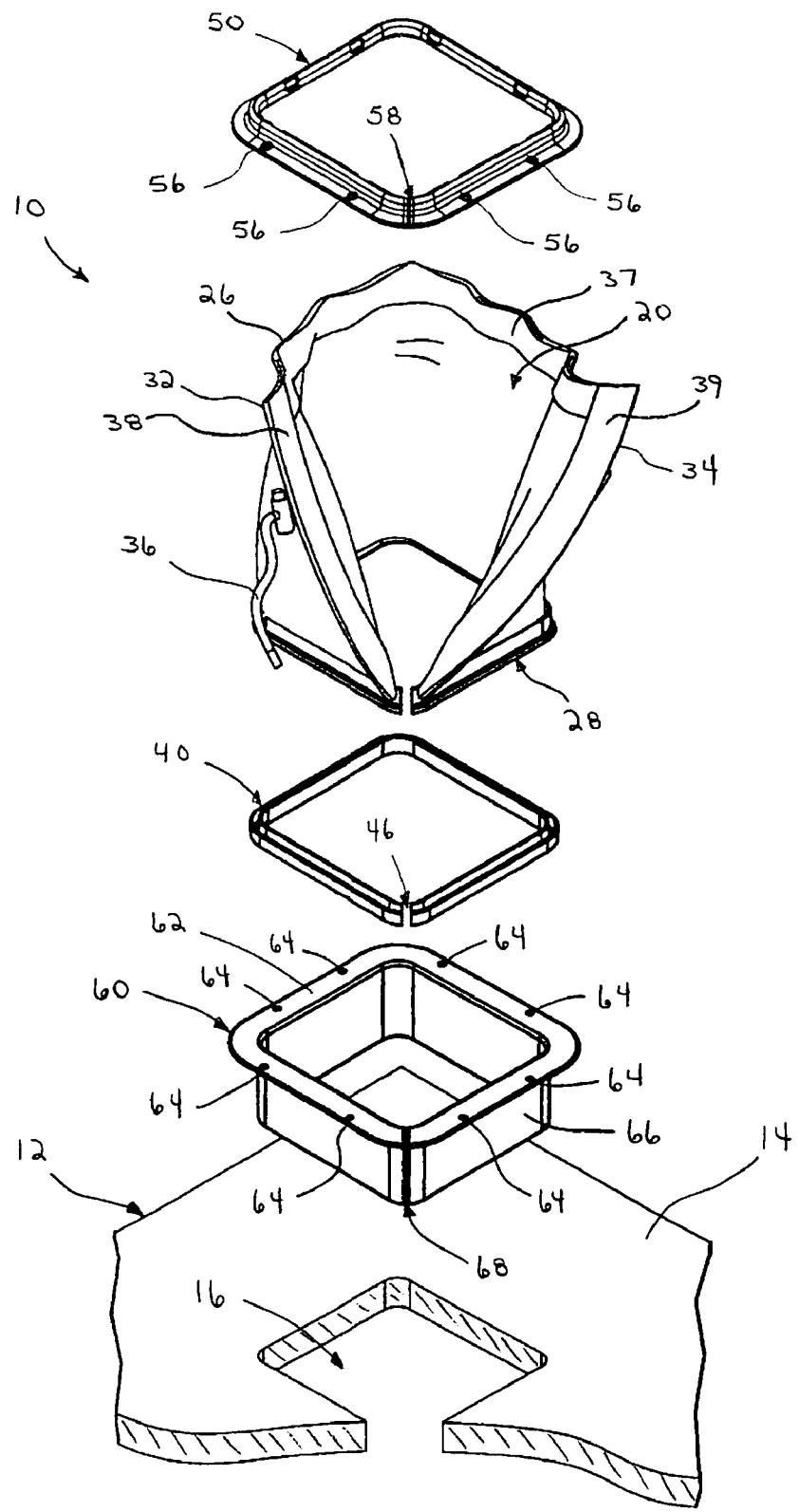
FIG. 3 is an exploded view of the sealing assembly of FIG. 1 without the cable/cable bundle.
Figure 4:
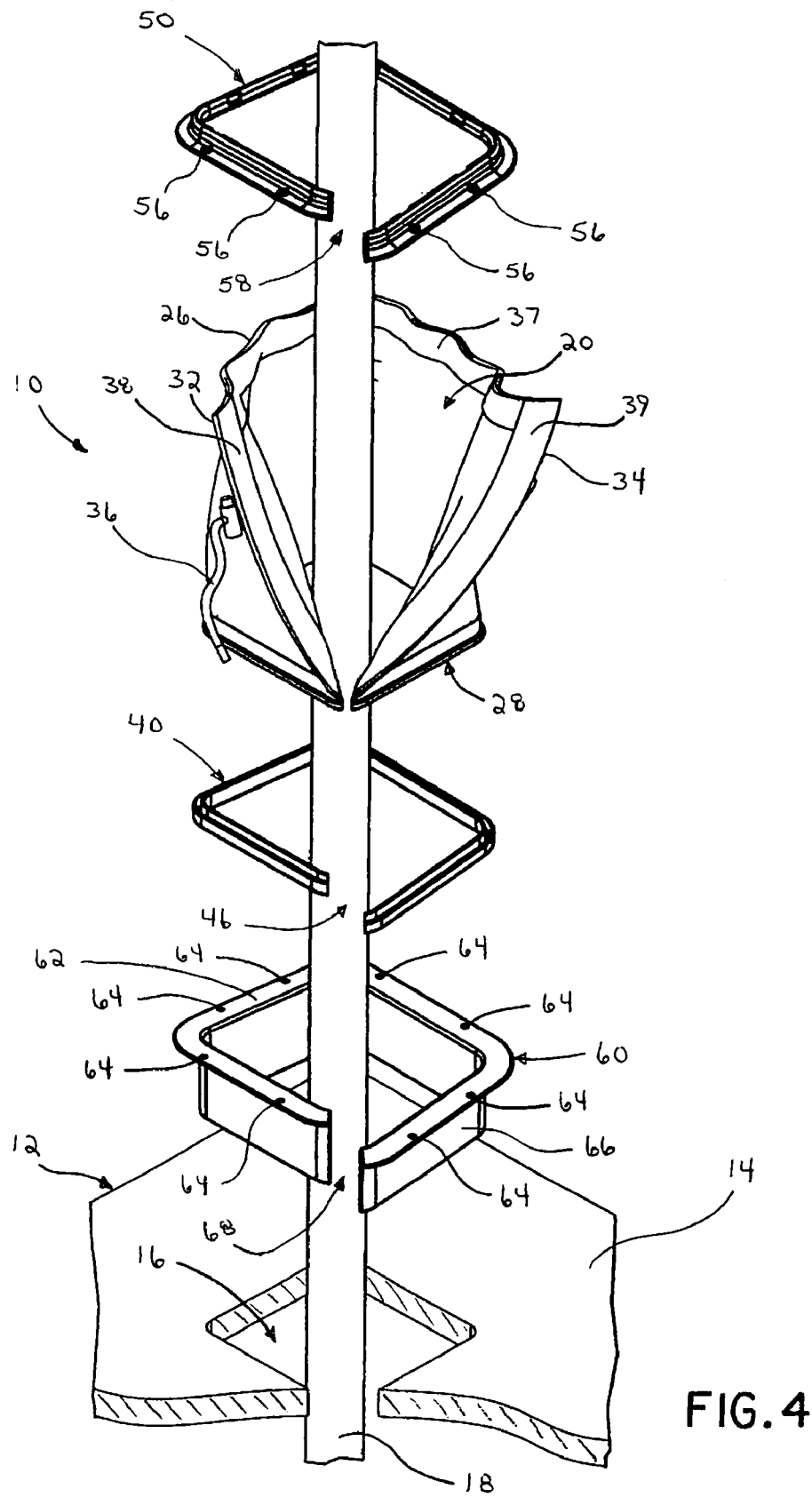
FIG. 4 is an exploded view of the sealing assembly of FIG. 1 with the cable/cable bundle.
Figure 5:
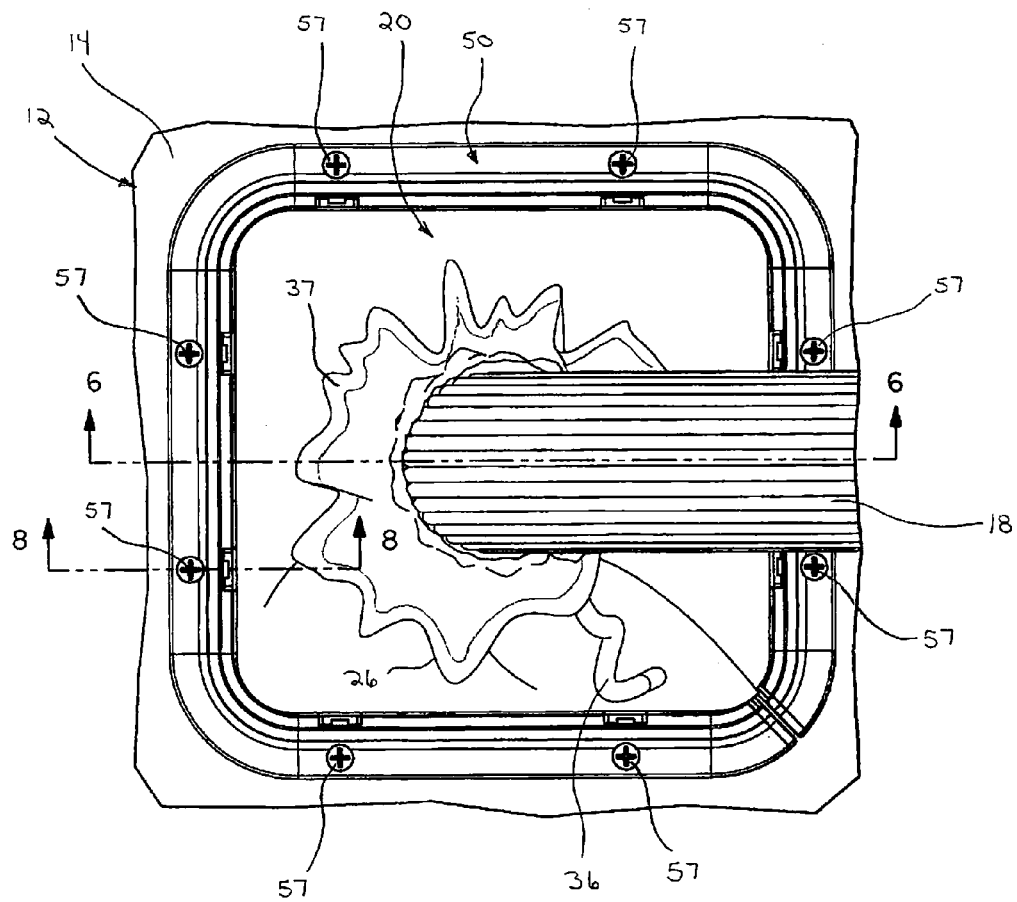
FIG. 5 is a top view of the sealing assembly of FIG. 1.
Figure 6:
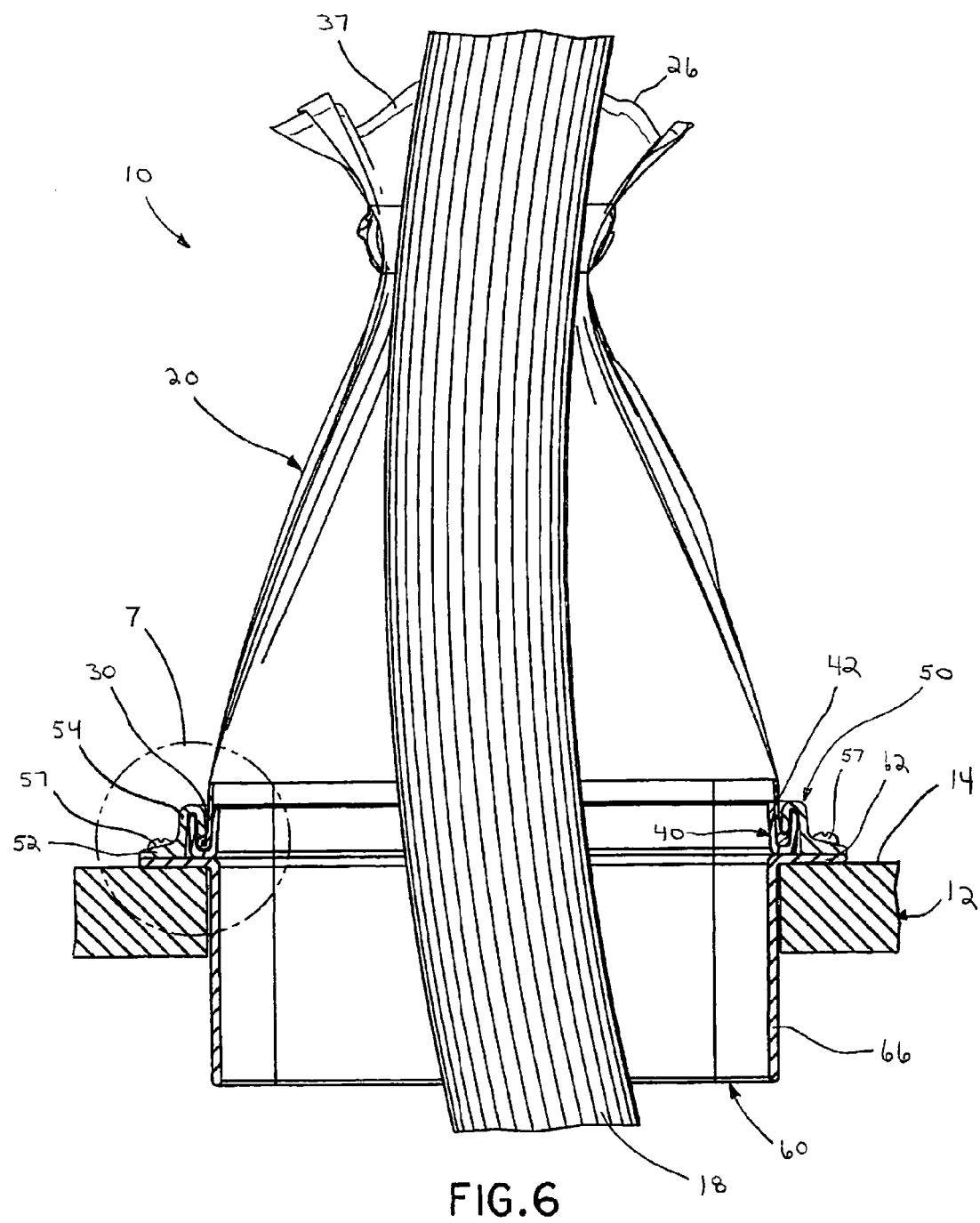
FIG. 6 is a cross-sectional view taken along line 6-6 in FIG. 5.

In the specific example shown, frame 40 also has slit 46, as can best be seen in FIGS. 3 and 4, which simplifies the installation of frame 40 and allows for installation of frame 40 around existing cables that are already installed. In addition, frame 40 could be made of an electrically conductive polycarbonate, such as Stat-kon D-FR, to assist in the dissipation of static electricity from cable 18. However, if cover 50 is constructed of an electrically conductive material, this may not be necessary. Furthermore, to meet specific codes, frame 40 could also be constructed of a flame retardant material.

Similarly, in the example shown, cover 50 is also generally square, is formed by first wall 52 and second wall 54, and is configured to fit over frame 40 and bottom edge 28 at the bottom portion of sleeve 20. First wall 52 is generally planar, is configured to engage first wall 62 of grommet 60, as seen in FIGS. 7 and 8. In this example, first wall 52 also has apertures 56, which are used to secure cover 50 to top surface 14 of floor panel 12 via screws 57, as described in more detail below. Second wall 54 extends generally perpendicular to first wall 52 and is generally U shaped, forming channel 55, which is configured to receive the outer wall of U shaped wall 42 of frame 40. In addition, at specified intervals around cover 50, second wall 54 has apertures (see FIG. 8) that are positioned and configured to receive protrusions 45 in frame 40.

In the specific example shown, cover 50 also has slit 58, as can best be seen in FIGS. 3 and 4, which simplifies the installation of cover 50 and allows for installation of cover 50 around existing cables that are already installed. In addition, in this example, cover 50 is constructed of an electrically conductive polycarbonate, such as Stat-kon D-FR, to assist in the dissipation of static electricity from cable 18 to top surface 14 of floor panel 12. To secure cover 50 to top surface 14 and to complete the grounding circuit between cable 18 and top surface 14, self-tapping screws 57 are inserted through apertures 56 and threaded into top surface 14, as seen in FIG. 8. To provide an electrical contact between screws 57 and cover 50, any well known method could be used. For example, if cover 50 is electrically conductive and does not contain any cover or coating, the contact between screws 57 and cover 50 will provide the contact. If cover 50 is painted or otherwise covered, the area around where screws 57 will contact cover 50 could be masked to provide a bare surface. In addition, internal tooth lock washers could be placed between the heads of screws 57 and cover 50 such that the teeth will bite into the material of cover 50 or screws having teeth underneath the head could be used, such that the teeth will bite into the material of cover 50. Furthermore, to meet specific codes, cover 50 could also be constructed of a flame retardant material.

Referring generally to FIGS. 1, 3-5, and 8, in the example shown grommet 60 is also generally square and is formed by first wall 62 and second wall 66. First wall 62 is generally planar and is configured to engage first wall 52 of cover 50 and top surface 14 of floor panel 12. In this example, first wall 62 also has apertures 64, which are axially aligned with apertures 56 in cover 50 such that they receive screws 57 during installation. Second wall 66 extends generally perpendicular to first wall 62 and is configured to extend into and through aperture 16 in top surface 14 of floor panel 12.

In the specific example shown, grommet 60 also has slit 68, as can best be seen in FIGS. 3 and 4, which simplifies the installation of grommet 60 and allows for the installation of grommet 60 around existing cables that are already installed. In addition, grommet 60 could be made of an electrically conductive material, such as Santoprene 251-80, to assist in the dissipation of static electricity from cable 18. However, if cover 50 is constructed of an electrically conductive material, this may not be necessary. Furthermore, to meet specific codes, grommet 60 could also be constructed of a flame retardant material.

Figure 9:
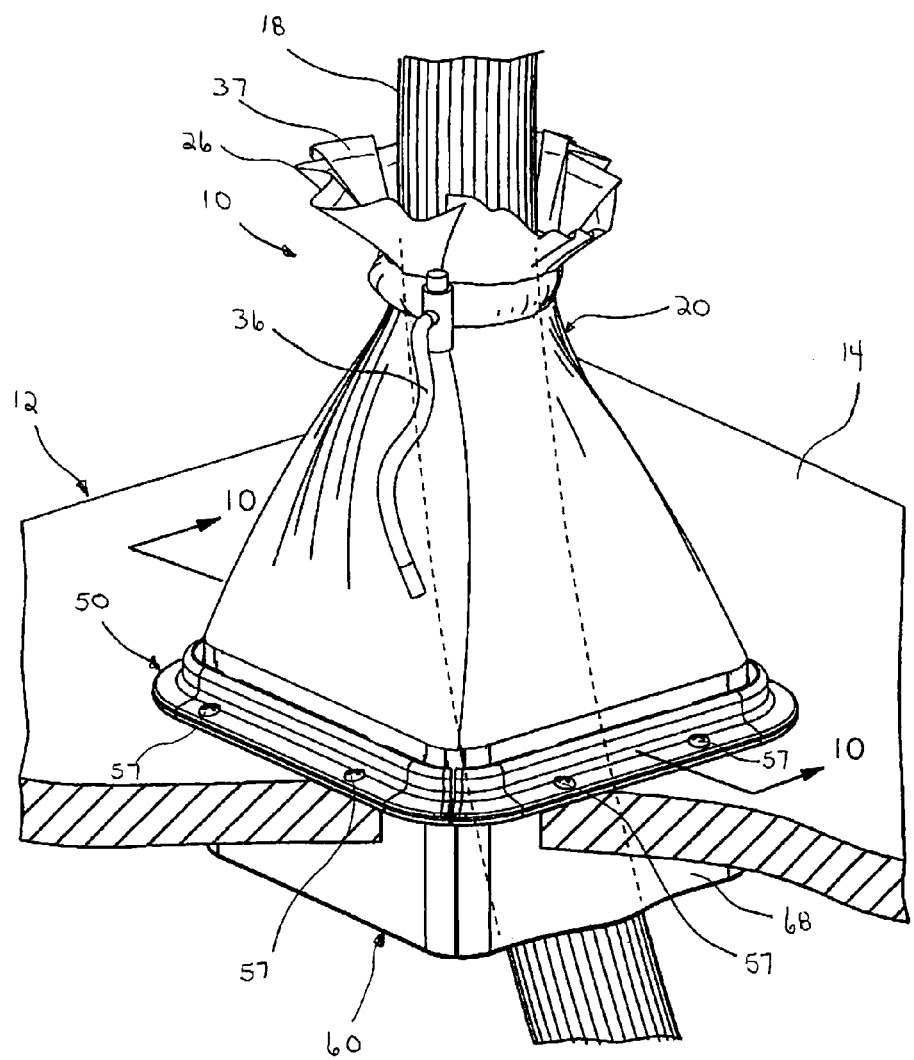
FIG. 9 is a perspective view of the sealing assembly of FIG. 1 with the cable/cable bundle in a non-centered position.
Figure 10:
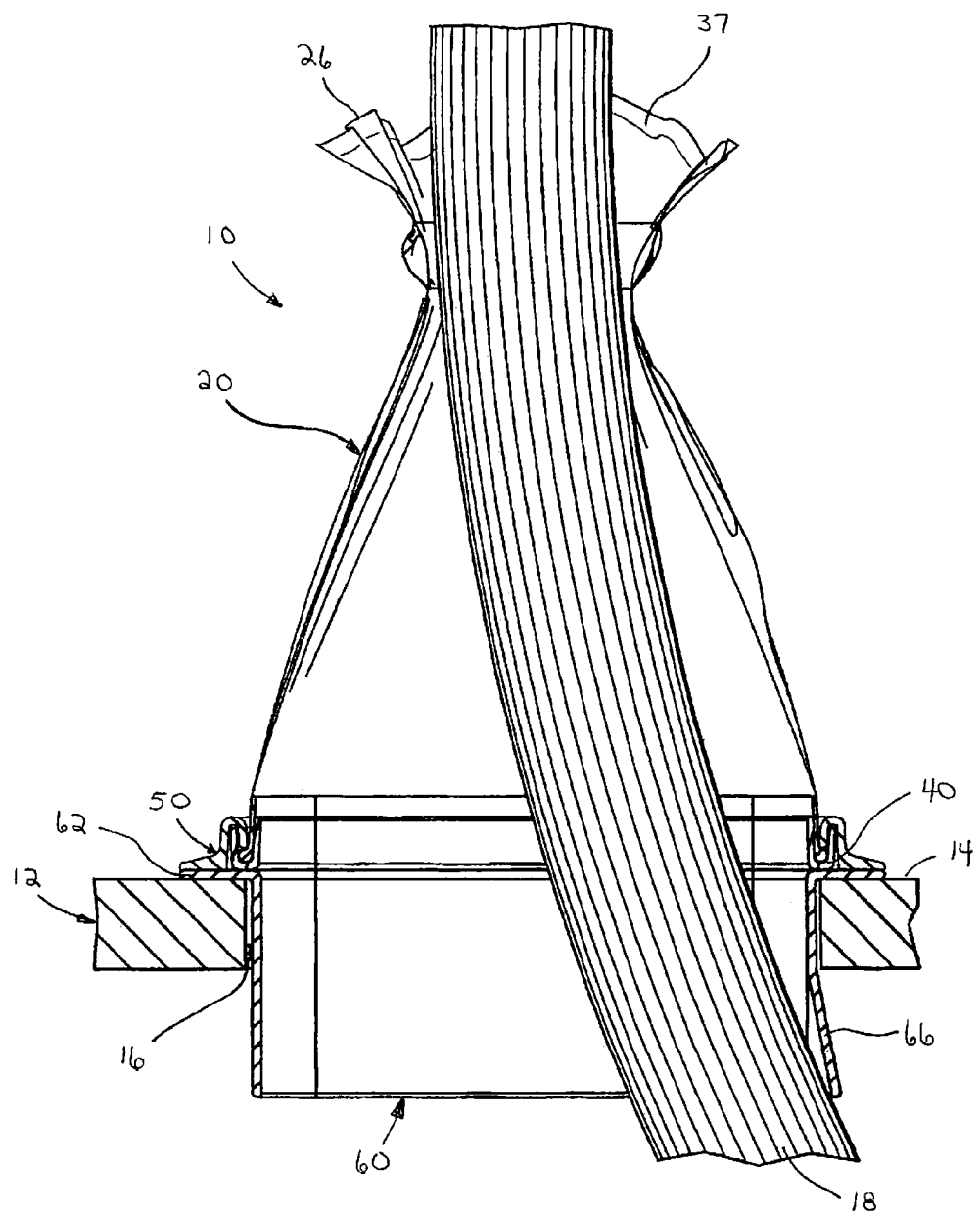
FIG. 10 is a cross-sectional view taken along line 10-10 in FIG. 9.

Furthermore, in the specific example shown, grommet 60 is constructed of a flexible material, such as a rubberized thermoplastic vulcanizate, so that second wall 66 protects cable 18. Referring specifically to FIGS. 9 and 10, if cable 18 is not centered in aperture 16, it is possible for cable 18 to contact and/or rub the edge of floor panel 12 at the perimeter of aperture 16, which could be rough or sharp. This contact could cut, fray, or otherwise damage cable 18. However, flexible second wall 66 of grommet 60 provides protection for cable 18 from sharp edges associated with aperture 16 in top surface 14. As can be seen in FIG. 10, if cable 18 is not centered, second wall 66 of grommet 60 will bend and conform to the natural bend of cable 18, which protects cable 18 from the potentially sharp bottom edge of floor panel 12 at the perimeter of aperture 16.

Grommet 60 is most easily used in new installations where aperture 16 in top surface 14 can be cut to a predetermined size to fit grommet 60 or in existing installations where aperture 16 can be enlarged to fit grommet 60. However, as will be seen in other installation examples below, grommet 60 is optional and sealing assembly 10 could be installed and used without grommet 60.

Figure 11:
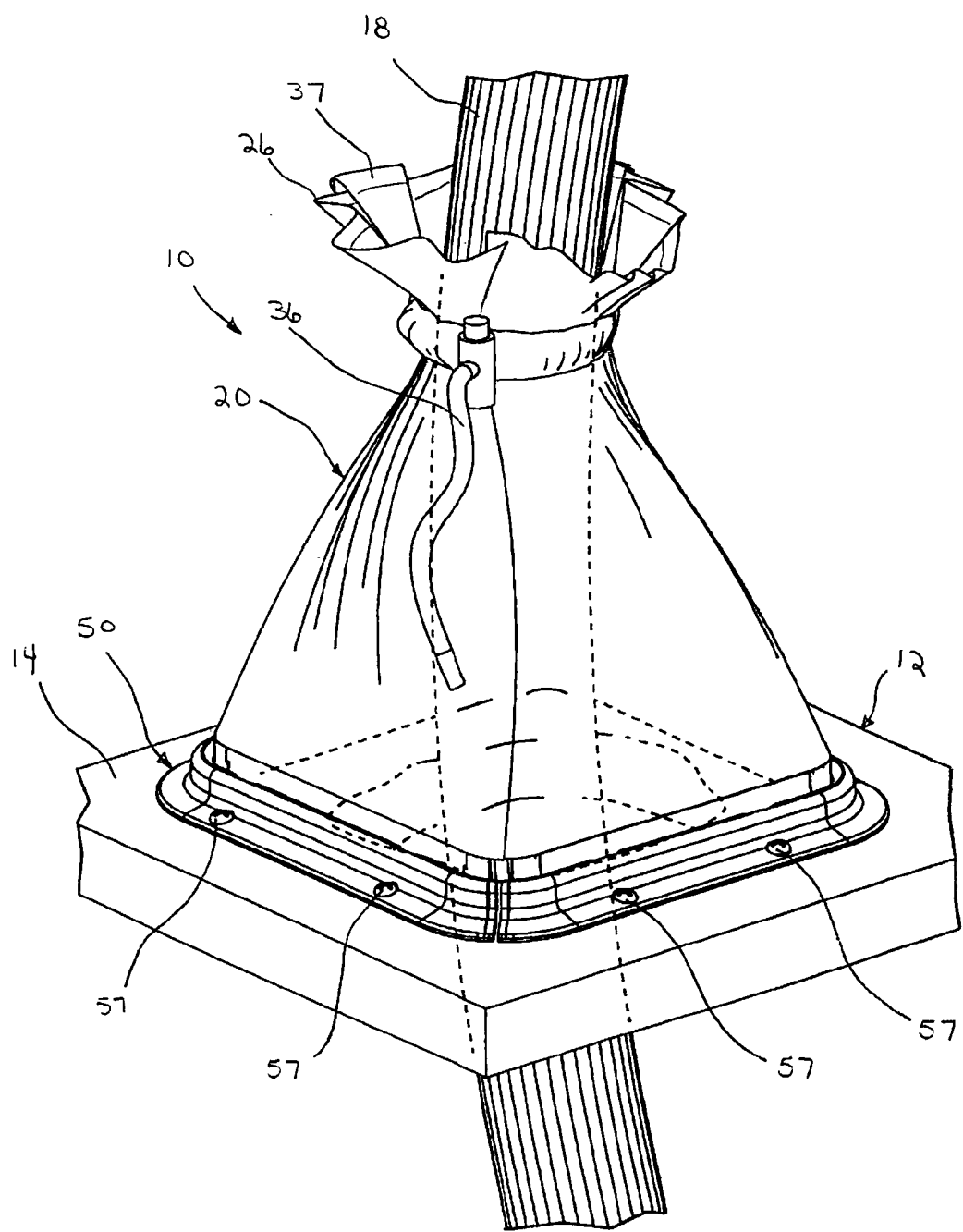
FIG. 11 is a perspective view of the sealing assembly of FIG. 1 as installed without the grommet.
Figure 12:
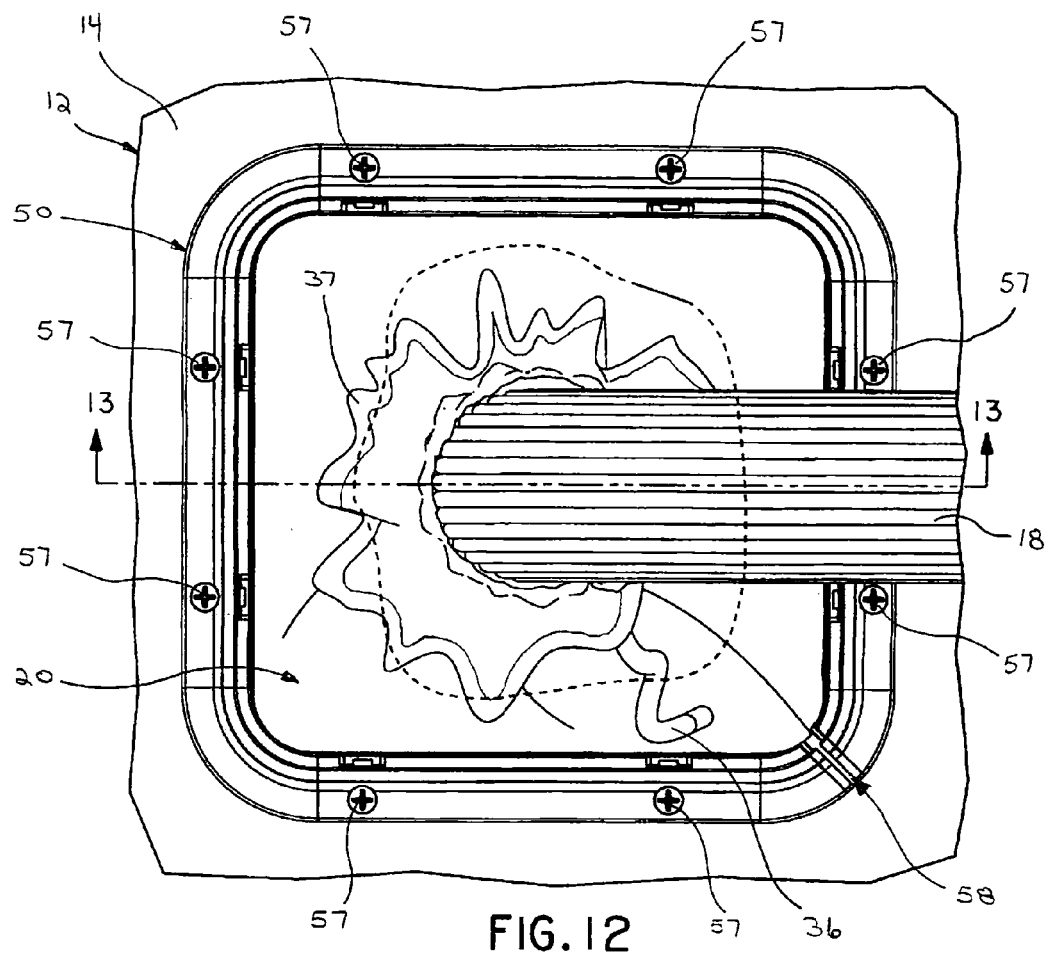
FIG. 12 is a top view of the sealing assembly of FIG. 11.
Figure 13:
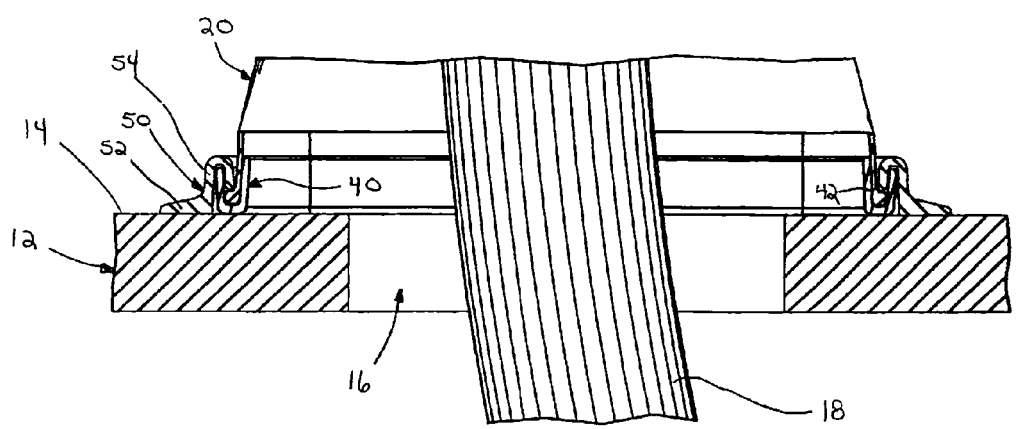
FIG. 13 is a cross-sectional view taken along line 13-13 in FIG. 12.

Referring now to FIGS. 11-13, an alternate installation of exemplary sealing assembly 10 is shown. As discussed above, sealing assembly 10 can be used in existing installations where apertures 16 are already formed in top surface 14 of floor panel 12 and cable 18 is already extending through aperture 16. In this case, if grommet 60 does not fit into or through aperture 16, sealing assembly 10 can be installed without grommet 60. As can be seen in FIGS. 11-13, in this type of installation sleeve 20 is still inserted into frame 40 and cover 50 is placed over the bottom portion of sleeve 20 and frame 40. The difference in the installation shown in these figures is that frame 40 and cover 50 are placed directly onto top surface 14 and secured with self-tapping screws 57, rather than placing cover 50 onto first wall 62 of grommet 60.

Figure 14:
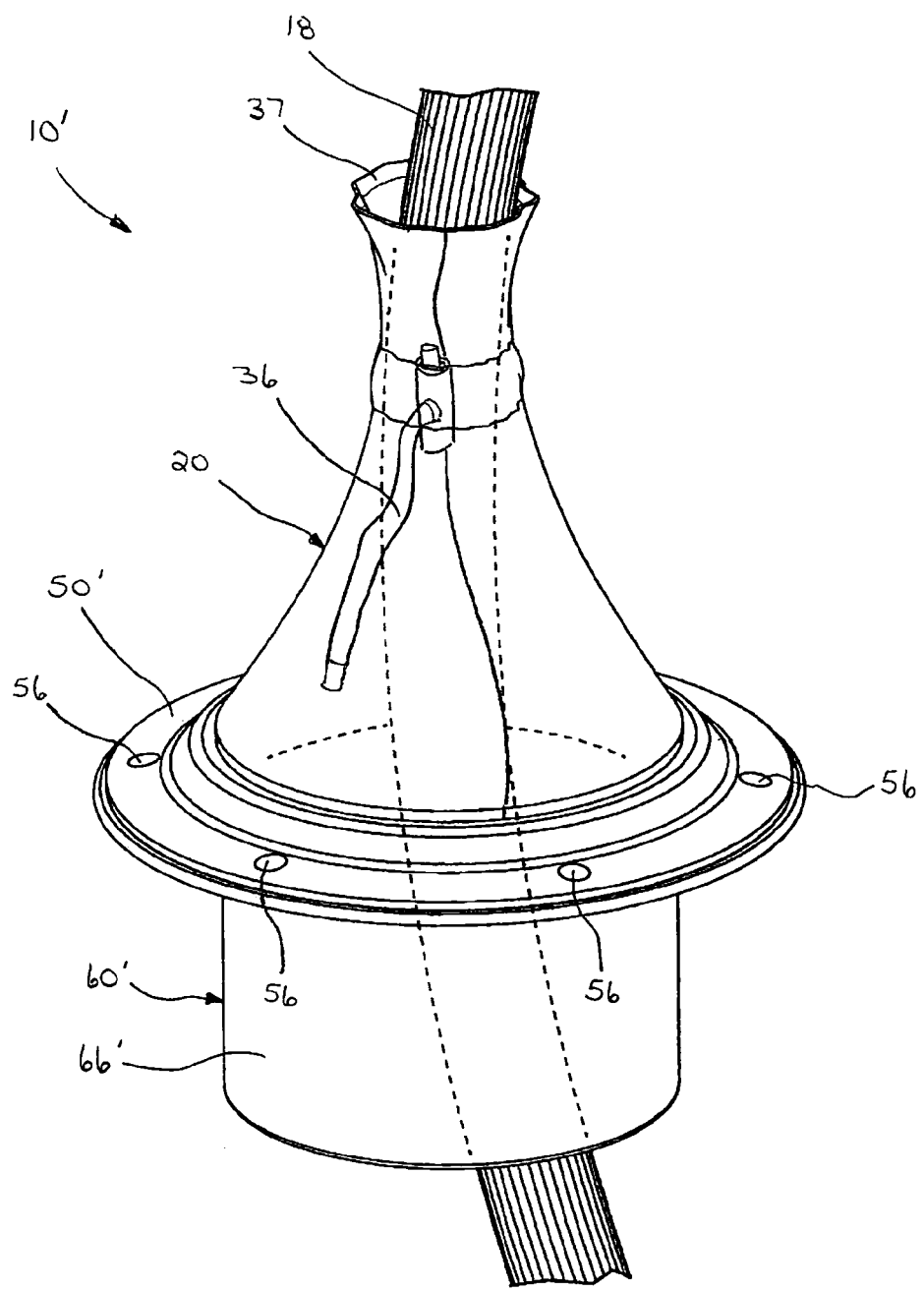
FIG. 14 is a perspective view of another example of a sealing assembly as installed on a raised floor panel.

Referring finally to FIG. 14, another example of a sealing assembly 10 is shown. The sealing assembly 10' is essentially the same as sealing assembly 10 shown in FIGS. 1-10 and common parts between the exemplary assemblies are designated with the same reference numbers. The main difference between the example shown in FIG. 14 and the example shown in FIGS. 1-10 is that in the sealing assembly 10' shown in FIG. 14, cover 50', frame 40' (not shown), and grommet 60' are circular, rather than square. Other than the difference in shape, the construction, characteristics, installation, etc. is that same as that described above.

As can be seen in the various examples above, in various installations square sealing assemblies 10 could be used, circular sealing assemblies 10 could be used, or a combination of square and circular sealing assemblies, or other shapes, could be used. For example, in the same installation square sealing assemblies 10 could be used with data cables and circular sealing assemblies 10' could be used with power cables or small data bundles. The use of both square and circular sealing assemblies provides an easy way to quickly and accurately identify the different cables and avoids data signal contamination that can occur when data cables and power cables are run together.

As mentioned above, sealing assemblies 10, 10' can be used to provide a grounding circuit between cable 18 and top surface 14 of floor panel 12 to provide static dissipation from cable 18. As discussed above, a ground path is created between cable 18 and top surface 14 through: (1) sleeve 20, which is electrically conductive and contacts cable 18 when sealed; (2) cover 50, which is electrically conductive and contacts sleeve 20; and (3) self-tapping screws 57, which are electrically conductive and contact cover 50 and are threaded into top surface 14, which in data centers is typically constructed of a conductive material, such as metal.

In new installations where apertures 16 in top surface 14 have not been formed and installation where apertures 16 can be adapted to fit grommet 60, 60', sealing assemblies 10, 10' shown in FIGS. 1-10 and 14 would typically be used.

To install sealing assemblies 10 or 10' in these types of installations, aperture 16 is cut into top surface 14 according to the size and shape of grommet 60 used and grommet 60 is positioned in aperture 16. If cable 18 is already extending through aperture 16, slit 68 in grommet 60 can be used to position grommet 60 around cable 18. Frame 40 is then positioned on grommet 60 and bottom edge 28 of sleeve 20 is inserted into channel 44 in frame 40 such that protuberance 30 is positioned within channel 44. Again, if cable 18 is already extending through aperture 16, slit 46 in frame 40 can be used to position frame 40 around cable 18. Similarly, first and second side edges 32, 34 of sleeve 20 can be separated by disengaging the hook and loop type fasteners 38, 39, sleeve 20 placed around cable 18, and fasteners 38, 39 re-engaged. Cover 50 is then placed over sleeve 20 and frame 40 such that the inner wall of second wall 54 is positioned with channel 44 of frame 40, thereby trapping protuberance 30 of sleeve 20, and apertures 56 in cover 50 are aligned with apertures 64 in grommet 60. Again, it cable 18 is already extending through aperture 16, slit 58 in cover 50 can be used to position cover 50 around cable 18. Screws 57 are then inserted through apertures 56, 64 in cover 50 and grommet 60 and screwed into top surface 14. This secures sealing assembly 10 to top surface 14 and provides a ground path from cable 18 to top surface 14. At this point, if cable 18 has not be inserted, cable 18 is extended through aperture 16, grommet 60, frame 40, cover 50, and sleeve 20. Top portion of sleeve 20 is then cinched around cable 18 by pulling drawstring 36 closed. In installations where drawstring 36 does not provide sufficient sealing or where multiple cables, cable bundles, or multiple cable bundles extend through sealing assembly 10, top portion of sleeve 20 can be sealed around each individual cable by engaging hook and loop fastener 37 around each cable or cable bundle.

In installations where apertures 16 are already formed in top surface 14 and cannot be adapted to fit grommets 60, 60', sealing assembly 10 can be installed as shown in FIGS. 11-13.

To install sealing assemblies 10 or 10' in these types of installations, frame 40 is positioned on top surface 14 such that frame 40 surrounds aperture 16. Bottom edge 28 of sleeve 20 is inserted into channel 44 in frame 40 such that protuberance 30 is positioned within channel 44. If cable 18 is already extending through aperture 16, slit 46 in frame 40 can be used to position frame 40 around cable 18. Similarly, first and second side edges 32, 34 of sleeve 20 can be separated by disengaging the hook and loop type fasteners 38, 39, sleeve 20 placed around cable 18, and fasteners 38, 39 re-engaged. Cover 50 is then placed over sleeve 20 and frame 40 such that the inner wall of second wall 54 is positioned with channel 44 of frame 40, thereby trapping protuberance 30 of sleeve 20. Again, if cable 18 is already extending through aperture 16, slit 58 in cover 50 can be used to position cover 50 around cable 18. Screws 57 are then inserted through apertures 56 in cover 50 and screwed into top surface 14. This secures sealing assembly 10 to top surface 14 and provides a ground path from cable 18 to top surface 14. At this point, if cable 18 has not been inserted, cable 18 is extended through aperture 16, frame 40, cover 50, and sleeve 20. Top portion of sleeve 20 is then cinched around cable 18 by pulling drawstring 36 closed. In installations where drawstring 36 does not provide sufficient sealing or where multiple cables, cable bundles, or multiple cable bundles extend through sealing assembly 10, top portion of sleeve 20 can be sealed around each individual cable by engaging hook and loop fastener 37 around each cable or cable bundle.

Finally, if cable 18 is not immediately pulled through aperture 16 after initial installation, an optional safety cover may be provided to place over sealing assembly 10 to prevent foot injuries until cable 18 is pulled through aperture 16 and sealing assembly 10.

The invention claimed is:

1. A sealing assembly, comprising:
   a flexible sleeve configured to receive at least one cable therethrough, the sleeve comprising a top portion and a bottom portion, the top portion of the sleeve positionable around the at least one cable and the bottom portion being securable to a surface; and
   a grommet formed separately from the sleeve and positioned adjacent the bottom portion of the sleeve, the grommet having a first wall and second wall that extends substantially perpendicular to the first wall, wherein
   the first wall of the grommet comprises a plurality of apertures for connecting the grommet to the surface; and
   the second wall of the grommet is configured to extend through an aperture in the surface and is flexible to protect the cable from sharp edges associated with the aperture in the surface.

2. The sealing assembly of claim 1, wherein the sleeve is electrically conductive.

3. The sealing assembly of claim 2, wherein the sleeve is constructed of a vinyl-coated fabric.

4. The sealing assembly of claim 1, further comprising a hook and loop fastener attached to the top portion of the sleeve.

5. The sealing assembly of claim 4, wherein the hook and loop fastener extends across substantially the entire top portion.

6. The sealing assembly of claim 4, wherein the hook and loop fastener is configured to seal the top portion of the sleeve around the at least one cable.

7. The sealing assembly of claim 1, further comprising a drawstring associated with the top portion of the sleeve.

8. The sealing assembly of claim 1, wherein:
   the sleeve is formed from a sheet of material having a top edge, a bottom edge, a first side edge, and a second side edge, and further comprises:
   a hook and loop fastener attached to the sleeve adjacent the first side edge; and
   a second hook and loop fastener attached to the sleeve adjacent the second side edge, wherein
   the hook and loop fastener and the second hook and loop fastener engage to position the sleeve around the at least one cable.

9. The sealing assembly of claim 1, wherein the grommet comprises a slit to allow the positioning of the grommet around the at least one cable.

10. The sealing assembly of claim 1, further comprising:
    a frame configured to receive the bottom portion of the sleeve and to be positioned adjacent the grommet; and
    a cover configured to fit over the frame and the bottom portion of the sleeve, the cover comprising a plurality of apertures that are axially aligned with the apertures in the grommet for connecting the cover to the surface.

11. The sealing assembly of claim 10, wherein the cover is electrically conductive.

12. The sealing assembly of claim 11, wherein the cover is constructed of a polycarbonate.

13. The sealing assembly of claim 10, wherein the frame is electrically conductive.

14. The sealing assembly of claim 13, wherein the frame is constructed of a polycarbonate.

15. The sealing assembly of claim 10, wherein the frame and the cover each comprise a slit to allow the positioning of the frame and cover around the at least one cable.

16. A sealing assembly, comprising:
    a flexible sleeve configured to receive at least one cable therethrough, the sleeve comprising a top portion and a bottom portion, the top portion of the sleeve positionable around the at least one cable and the bottom portion being securable to a surface; and
    a grommet positioned adjacent the bottom portion of the sleeve, the grommet having a first wall and a second wall that extends substantially perpendicular to the first wall, wherein
    the first wall of the grommet comprises a plurality of apertures for connecting the grommet to the surface;
    the second wall of the grommet is configured to extend away from the sleeve and through an aperture in the surface; and
    the second wall of the grommet is flexible to protect the cable from sharp edges associated with the aperture in the surface.

17. The sealing assembly of claim 16, wherein the grommet comprises a slit to allow the positioning of the grommet around the at least one cable.

18. The sealing assembly of claim 16, wherein:
    the sleeve is formed from a sheet of material having a top edge, a bottom edge, a first side edge, and a second side edge, and further comprises:
    a hook and loop fastener attached to the sleeve adjacent the first side edge; and
    a second hook and loop fastener attached to the sleeve adjacent the second side edge, wherein
    the hook and loop fastener and the second hook and loop fastener engage to position the sleeve around the at least one cable.

19. The sealing assembly of claim 16, wherein the sleeve is electrically conductive.

20. The sealing assembly of claim 16, further comprising a hook and loop fastener attached to the top portion of the sleeve.

* * * * *